United States Patent [19]

Dagenais et al.

[11] Patent Number: 4,921,336
[45] Date of Patent: May 1, 1990

[54] ARRAY OF BISTABLE DEVICES AND APPARATUS AND METHODS FOR CREATING SAME

[75] Inventors: Mario Dagenais, Wellesley; Wayne F. Sharfin, Lexington; Robert J. Seymour, Wellesley; Boris S. Elman, Brighton, all of Mass.

[73] Assignee: GTE Laboratories Incorporated, Waltham, Mass.

[21] Appl. No.: 811,261

[22] Filed: Dec. 20, 1985

[51] Int. Cl.[5] .............................................. G02F 1/015
[52] U.S. Cl. ..................................... 350/354; 350/386
[58] Field of Search ................ 350/354, 386, 393, 388

[56] References Cited

U.S. PATENT DOCUMENTS

| 3,253,497 | 5/1966 | Dreyer | 350/354 |
|---|---|---|---|
| 3,887,271 | 6/1975 | Yamaguchi et al. | 350/354 |
| 4,203,649 | 5/1980 | Velasco et al. | 350/356 |

FOREIGN PATENT DOCUMENTS 36955  3/1979  Japan .................................. 350/354

OTHER PUBLICATIONS

Athale et al., "Development of an Optical Parallel Logic Device and a Half-Adder Circuit for Digital Optical Processing", Optical Engineering, 9,10–79, pp. 513–517.

Dagenais, M., "Low Power Optical Saturation of Bound Excitons with Giant Oscillator Strength", App. Phys. Lett., 10-1983, pp. 742–744.

Korsunskaya et al., "Drift of Interstitial Atoms in an Electric Field Applied to Pure and Li-Doped CDS Crystals", Sov. Phys. Semicond. 2-1981, pp. 161–163.

Dagenais et al., "Low Power Transverse Optical Bistability Near Bound Excitons in Cadmium Sulfide", App. Phy. Lett., 3-15-84, pp. 574–576.

Dagenais et al., "Linear-and Nonlinear-Optical Properties of Free & Bound Excitons in CDS & Applications in Bistable Devices", Jr. Opt. Soc. Am. B., 7-1985, pp. 1179–1187.

Primary Examiner—Rodney B. Bovernick
Assistant Examiner—Martin Lerner
Attorney, Agent, or Firm—James J. Cannon, Jr.

[57] ABSTRACT

An array of bistable devices includes a thin cadmium sulfide platelet having a first portion thereof that is substantially pure and the remaining portion thereof is implanted with atoms that can bind excitons. Such remaining portion can be implanted with ions from a lithium source. Apparatus for providing such an array can include a source of lithium ions and masking means for selectively permitting and for selectively inhibiting passage of ions from the source to pass therethrough and to implant in a pattern onto the platelet. The apparatus operates at temperatures in the neighborhood of liquid helium. A method for producing such an array includes providing a thin, substantially pure, platelet of cadmium sulfide, selectively masking the platelet with a pattern to selectively permit and to selectively inhibit passage of ions onto the platelet, and providing a source of ions. The source of ions, in accordance with certain features, can be lithium ions.

7 Claims, 1 Drawing Sheet

ARRAY OF BISTABLE DEVICES AND APPARATUS AND METHODS FOR CREATING SAME

BACKGROUND OF THE INVENTION

1. Field of the Invention

This invention relates to an array of bistable devices, and to apparatus for and methods of creating same. Accordingly, it is a general object of this invention to provide new and improved arrays, apparatus and methods of such character.

2. General Background

We propose a new technique or making a 2-dimensional spatial light modulator based on cavityless optical bistability that reduces the effects of heat diffusion and crosstalks, thus making it possible to spatially distribute optical bistable devices in a 2-dimensional plane in a pre-selected and controlled manner.

Two-dimensional spatial light modulators should play an important role in all-optical signal processing applications (such as image processing), optical computation, and in making optical interconnections among electronic and electro-optic systems. Two-dimensional arrays of optical bistable devices can be used as all-optical two-dimensional spatial light modulators. Optical switching, optical logic operations, limiting, AC amplification, and modulation have already been demonstrated using optical bistable devices. However, in conventional optical bistable devices, the requirement for a cavity and some type of external optical feedback puts serious restrictions on the ease of fabricating the devices. Very often, reflective coatings have to be deposited, and distributed feedback structures have to be provided which add to the complexity of the fabrication process. Earlier, two of us have filed a copending U.S. patent application Ser. No. 06/713,510 on Mar. 19, 1985 now abandoned on an optical bistable device. That device is cavityless and is based on induced absorption. This induced absorption comes from a thermal shift of a sharp resonance or absorption edge in a semiconductor. In addition to the ease of fabrication, this new optical bistable device has the important advantages that its output is very stable (no self-pulsation) under cw conditions and is very reproducible. However, in order to use such a device, in two-dimensional arrays, it is necessary to reduce the crosstalk between the devices. As the principle of operation of this bistable device is based on optical heating, and as heat can diffuse, it is desirable to minimize the amount of heat deposited into the sample.

SUMMARY OF THE INVENTION

It is another object of this invention to provide optical bistability in systems that are cavityless.

Yet another object of this invention is to provide new and improved bistable devices utilizing ion implantation to create a sharp resonance that can be optically and thermally shifted.

Still another object of this invention is to provide a new and improved optical bistable system that, through the implantation of appropriate ions, localized regions containing bound excitons having the required binding energy can be selectivity created to generate a two-dimensional array of bistable switches.

As stated above, it is proposed to use ion implantation to create the sharp resonances that can be optically and thermally shifted and that lead to cavityless optical bistability. The distance between two bistable devices can be controlled by using a mask during the ion implantation process. By using appropriate ions, we can selectively create bound excitons with the required binding energy. As these excitons are bound to impurities and as the type of impurities can be selected by choosing the appropriate ions in an ion implantation process, it is possible to generate two-dimensional arrays of bistable devices in a controlled manner. By preventing the light from being absorbed between two bistable devices, the amount of heat being generated in the sample is reduced and, hence, the amount of crosstalk is reduced.

As cross-talk is a very important parameter in the design of a 2-dimensional array, our approach permits us to spatially distribute, in a 2-dimensional plane, optical bistable devices in a pre-selected manner. Contrariwise, optical bistability based on an intrinsic resonance (as the sharp free exciton or absorption edge in a direct gap semiconductor) does not offer such processibility.

In accordance with one aspect of the invention, an array of bistable devices includes a thin cadmium sulfide platelet having two portions: one substantially pure, and the other mplanted with atoms that can bind excitons.

In accordance with another aspect of the invention, an array of bistable devices includes a thin cadmium sulfide platelet having a first portion thereof substantially pure, and having a second portion thereof patterned and implanted with ions from a lithium source. Other types of ions that can bind excitons (such as sodium) can be used.

In accordance with still another aspect of the invention, apparatus for producing such a two-dimensional array of bistable devices includes a thin cadmium sulfide platelet and a source of lithium ion. Masking means selectively permit, and selectively inhibit, passage of ions from the source to pass therethrough and to implant in a pattern onto the platelet. In accordance with certain features, the apparatus can include means for providing temperatures in the neighborhood of liquid helium.

In yet another aspect of the invention, a method of producing an array of bistable devices includes providing a thin, substantially pure, platelet of cadmium sulfide. The patelet is then selectively masked with a pattern to selectively permit and to selectively inhibit passage of ions onto the platelet, and a source of ions is provided. In accordance with certain features, the ions can be lithium ions or other types of ions that can bind excitons, such as sodium ions.

BRIEF DESCRIPTION OF THE DRAWING

Other objects, advantages, and features of this invention, together with its construction and mode of operation, will become more apparent from the following description, when read in conjunction of the accompanying drawing, in which.

GENERAL DESCRIPTION

Figure 1A:
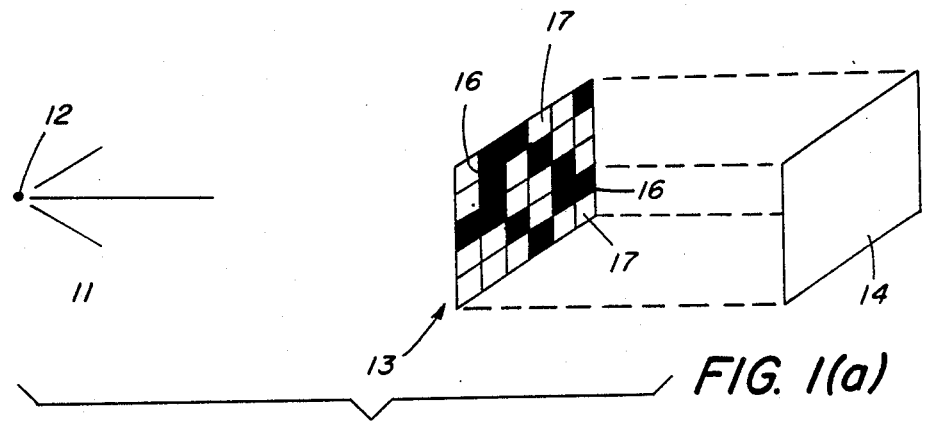
FIGS. 1(a) and 1(b) are a schematic diagram of an embodiment of the invention.
Figure 1B:
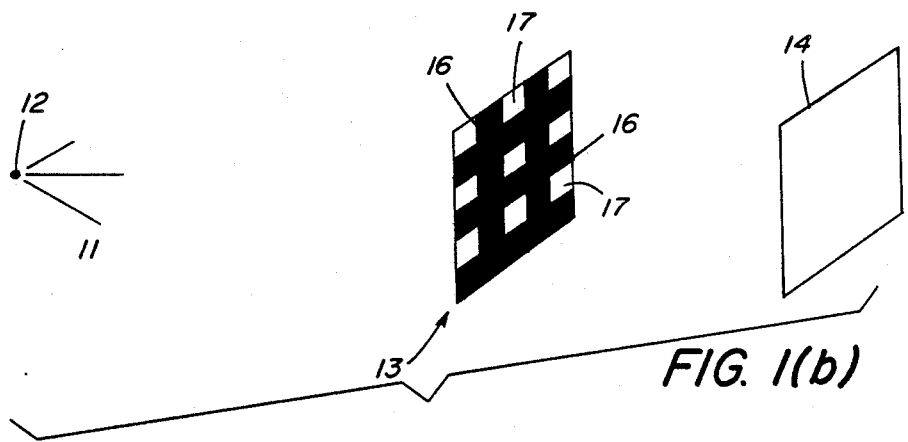

A spatial distribution of bistable devices can be impressed in certain material in a pre-selected and controlled manner. This description, however, is directed to cadium sulfide as the nonlinear material since cadmium sulfide is the material that was used in our experiments. The concepts presented here, however, are much more general and can be applied to other materials. The sole FIGURE of the drawing shows how a particular pattern can be impressed in a controlled manner with a sample of cadmium sulfide. Two situations are illustrated: FIG. 1(a) corresponds to a non-regular array; FIG. 1(b) corresponds to a regular array.

Referring to the drawing, there is shown an ion beam 11, which emits from a source 12, that is directed through a mask 13 to a cadmium sulfide platelet 14.

The solid black areas 16—16 of the mask 13 prevent the ions 11 from impinging on the sample 14 and thereby create the sharp extrinsic resonances (bound exciton resonance) that is required to provide cavityless optical bistability. The white areas 17—17 are the transmitting portions of the mask 13. The implanted cadmium sulfide sample 14 can then be used as a two-dimensional spatial light modulator. The unimplanted areas do not absorb any light and do not generate any heat, thus reducing cross-talk among the bistable devices of the implanted areas.

It is desirable to provide such a two-dimensional array of bistable devices in order to achieve parallel signal processing, whereby images can be directly processed by a two-dimensional array of bistable devices. Thus, an entire image can be processed in a single step. This can be achieved through the technique of ion implantation and the well established technologies of mask formation and sample deposition. Essentially, any type of pattern can be formed on such a sample.

Initially, we provide a very pure cadmium sulfide platelet 14, that is, there are no impurities in that sample. As there are no impurities, there are no bound excitons and no bound excitonic nonlinearities.

Through the use of a mask 13 and the application of ions 11 from the source 12, a two-dimensional array of optical bistable devices is provided that is so especially organized in a manner governed by the patterns 16—16 and 17—17 on the mask 13. Additional treatment of the sample (annealing, for example) might be required subsequent to ion implantation. After ion implantation and subsequent treatment (if required), that is, when the sample 14 is implanted with the ions, a two-dimensional array of bistable devices is provided. Such an array can be addressed with many input beams; such a plurality of input beams could come from images or from many different optical sources. Thus, logical operations could be performed on these incoming beam simultaneously in one step.

What is claimed is:

1. An array of bistable devices comprising
   a thin cadmium sulfide platelet having a first portion thereof substantially pure, and a second portion thereof rich in bound excitons.

2. An array of bistable devices comprising
   a thin cadmium sulfide platelet having a first portion thereof substantially pure, and a second patterned portion thereof implanted with ions from a lithium source.

3. Apparatus for producing a two-dimensional array of bistable devices comprising
   a thin cadmium sulfide platelet,
   a source of ions that can bind excitons, and
   masking means for selectively permitting, and for selectively inhibiting, passage of ions from said source to pass therethrough and to implant in a pattern onto said platelet.

4. Apparatus as recited in claim 3 wherein said ions are selected from the group consisting of lithium ions and sodium ions.

5. Apparatus as recited in claim 3 further including means for providing temperatures in the neighborhood of liquid helium.

6. A method of producing an array of bistable devices comprising
   providing a thin, substantially pure, platelet of cadmium sulfide,
   selectively masking said platelet with a pattern to selectively permit, and selectively inhibit, passage of ions onto said platelet, and
   providing a source of ions.

7. The method as recited in claim 6 wherein said ions are selected from the group consisting of lithium ions and sodium ions or any other types of ions that can bind excitons.

* * * * *